United States Patent [19]
Magder et al.

[11] 4,176,148
[45] Nov. 27, 1979

[54] METHOD OF MANUFACTURING MICROPOROUS PAPER-LIKE BUTENE-1 POLYMER SHEETS

[75] Inventors: Jules Magder; Murray H. Reich, both of Princeton, N.J.

[73] Assignee: Princeton Chemical Research, Inc., Princeton, N.J.

[21] Appl. No.: 488,135

[22] Filed: Jul. 12, 1974

Related U.S. Application Data

[63] Continuation-in-part of Ser. No. 335,639, Feb. 26, 1973, abandoned, which is a continuation of Ser. No. 175,988, Aug. 30, 1971, abandoned.

[51] Int. Cl.² ............................................. B29D 27/00
[52] U.S. Cl. ..................................... 264/41; 264/45.3; 264/132; 264/145; 264/154; 264/210.6; 264/288.8; 264/290.2
[58] Field of Search ............. 264/49, 210 R, DIG. 47, 264/45.3; 260/2.5 M

[56] References Cited

U.S. PATENT DOCUMENTS

| | | | |
|---|---|---|---|
| 3,154,461 | 10/1964 | Johnson | 428/159 |
| 3,544,489 | 12/1970 | Dowbenko et al. | 260/2.5 M |
| 3,551,194 | 12/1970 | Shepherd et al. | 428/220 |
| 3,796,778 | 3/1974 | Gallacher | 264/49 |
| 3,839,240 | 10/1974 | Zimmerman | 264/210 R X |
| 3,840,625 | 10/1974 | Yamamoto et al. | 264/49 X |
| 3,843,761 | 10/1974 | Bierenbaum et al. | 264/210 R |
| 3,903,234 | 9/1975 | Ikeda et al. | 264/210 R |

*Primary Examiner*—Philip Anderson
*Attorney, Agent, or Firm*—Sprung, Felfe, Horn, Lynch & Kramer

[57] ABSTRACT

A paper like butene-1 polymer sheet material is made by extruding a composition comprising (a) about 20 to 97% by weight of a butene-1 polymer having a molecular weight in excess of about 20,000, an isotacticity of at least about 25% and a butene-1 content of at least about 50% by weight, and (b) about 3 to 80% by weight of at least one normally solid filler insoluble in said polymer, to form a sheet, and stretching said sheet at least about 5% beyond its yield strain. The filler may be organic or inorganic and the sheet is preferably stretched at least about 20% beyond its yield point. The sheet is characterized by a novel surface appearance when scanned in an electron microscope, by dimensional stability and by approximately equal strengths in all directions as evidenced by a maximum tensile strength ratio of about 13:1 in mutually perpendicular directions.

7 Claims, 6 Drawing Figures

METHOD OF MANUFACTURING MICROPOROUS PAPER-LIKE BUTENE-1 POLYMER SHEETS

This application is a continuation-in-part of Application Ser. No. 335,639, filed Feb. 26, 1973, and now abandoned which is a continuation of Application Ser. No. 175,988, filed Aug. 30, 1971, now abandoned.

The present invention relates to a novel method of manufacturing plastic products based on butene-1 polymers containing at least one filler. More specifically, the invention relates to filled butene-1 polymer compositions which have been stretched under specified conditions, so as to yield products with remarkably altered surface and opacity characteristics when compared to the corresponding unstretched compositions.

In recent years wood pulp has become increasingly scarce, and the cost of harvesting trees for pulp has likewise increased. This continuing scarcity has prompted the search both for alternative sources of celluosic fibers for the manufacture of paper, and also the search for synthetic paper substitute materials such as based on synthetic resins.

In the manufacture of pulp and paper very large quantities of water are used, resulting in severe effluent problems. For example, typical pulp and paper mills discharge from 30,000 to as much as 500,000 gallons of water per ton of paper produced (Organization for European Economic Cooperation, "Re-Use of Waste Water in Germany", W. J. Muller, 1969). Effluent water often contains organic materials such as lignin residues, wood sugars, phenolic materials, etc., which can be toxic to aquatic life, and cause excessive biological oxygen demand, thus resulting in serious ecological damage to waterways, lakes and oceans. Other pollutants include cellulosic fibers, clays and sulfur and chlorine compounds. Pulp and paper mills also contribute severely to air pollution. In many cases the addition of pollution and effluent control devices to the mills would be economically prohibitive or else result in substantial increases in the cost of making paper.

Although various synthetic resins such as polyethylene and polypropylene have been proposed as bases for paper substitutes, the surfaces of such resins are inherently hydrophobic and non-polar, resulting in poor or inadequate receptivity to common writing and printing materials such as inks, pencils, paint and the like. Attempts to improve the ink-receptivity of such resins by the addition of polar fillers, for example, have been unsuccessful because relatively small amounts of such fillers are ineffective, since the filler particles remain totally encapsulated by the resins and thus the surface of the sheet still presents a homogeneous non-polar surface. Larger amounts of fillers result in a deterioration of the physical properties, such as flexibility, tear resistance, tensile strength, etc., to the point where the filled resins are no longer useful as paper substitutes.

Other resins such as polyvinyl chloride or polystyrene which have also been proposed in various forms as paper substitutes are difficult to dispose of by incineration without causing pollution or corrosion problems.

One object of the present invention is to provide a method of manufacturing a resin-based paper substitute which does not create effluent or environmental problems when manufactured, such as is typical of the pulp and paper industry. Another object is to provide a method of manufacturing products which can be manufactured using conventional plastics polymerization and processing equipment.

Another object is to provide a method of manufacturing paper-like materials which are ink-receptive and ink-retentive, without the necessity of surface treatment or surface coating processes. A further object is to provide a method of manufacturing paper substitutes which are readily disposed of by burning in conventional incinerators, without the creation of smoke or corrosive effluents.

We have now discovered that suitable filled polybutene compositions in the form of sheets or films can be stretched under specific conditions to give products that are ink-receptive and ink-retentive, or have other novel paper-like characteristics. Such products are eminently suitable for use as paper substitutes, and for the manufacture of paper-like articles.

Specifically, an ink-retentive sheet material is produced by extruding a composition comprising (a) about 20 to 97% by weight of a butene-1 polymer having a molecular weight in excess of about 20,000, an isotacticity of at least about 25% and a butene-1 content of at least about 50% by weight, and (b) about 3 to 80% by weight of at least one normally solid filler insoluble in said polymer, to form a sheet, and stretching said sheet at least about 5% beyond its yield strain, whereby said sheet is opacified and rendered ink-retentive. Advantageously, the sheet is stretched in the machine and transverse directions at least about 20% beyond its yield strain.

The butene-1 polymer compositions of the present invention have enhanced tensile strength, water and moisture resistance, wet strength, tear resistance, creep resistance, grease resistance, and other excellent barrier properties, which are inherent properties of the base resin. By contrast cellulosic-based papers require the addition of other materials such as sizing, synthetic resins, etc., or else the fabrication of laminates, in order to achieve such enhanced properties.

A serious disadvantage of synthetic-resin based paper substitutes which have been proposed previously is the fact that they do not degrade when discarded outdoors, unlike cellulosic paper which eventually decays when subjected to weathering and microbial action. However, when exposed to outdoor solar radiation, products of the present invention can be made to degrade by the use of suitable stabilizer systems and thermal treatments, according to the method of U.S. Pat. Application Ser. No. 93,393 filed Nov. 27, 1970 assigned to the assignee of the present application and now U.S. Pat. No. 3,886,683. Thus, the products of the present invention can be made disposable by outdoor degradation without harm to or pollution of the environment.

Products of the present invention are useful as substitute writing and printing papers. Such uses include the printing of consumer magazines; trade and technical journals; reference books and directories; mail order catalogs; direct mail and trade catalogs; books, particularly children's books which require superior tear resistance, factory manuals and books used outdoors which require enhanced water-, grease-, or oil-resistance; book dust jackets; greeting cards; documents such as driver's licenses and passports; labels and tags, especially for outdoor use; magazine and catalog covers; menus; cooking recipe cards; printed advertising, handbills, billboards, posters, signs, and notices; maps, wall charts, and wall paper; and art reproduction prints. Other uses include graphic, music, drafting, and art paper; adding machine, duplicating, ledger, envelope, diazo, manifold, onion skin, xerographic, lithograph and offset paper; computer paper; photographic print paper; filing cards, data retrieval cards, file folders, and data processing cards; bond paper, letter-writing paper, typewriting paper, carbon paper, air mail paper, personal stationery, exercise books, school tablets; banknote, check and stamp paper.

Other uses of the paper-like products of the present invention are in packaging. These applications include grocery, shopping and packaging bags; refuse and garbage bags; tissue wrap for flowers and shoes; inserts for hosiery and apparel; handbag stuffing; food wrap such as for individual fruit, meats, fish, and particularly greasy foods such as butter, margarine, sausage, cold cuts, baked goods, cheeses, and carry-out hamburgers and french fries; glassine paper substitutes; pouches for dry soup and sauce mixes; cereal box liners and soda cracker inner wraps; vegetable parchment; frozen food wrap; cigarette packs; record sleeves; shipping wrap; heavy duty bags such as for cement, fertilizer, feedstuff, chemicals, etc.

Other embodiments of the present invention are useful as substitute textile articles, such as napkins, wiping cloths and table cloths; hospital and stewardess' gowns, physicians's gloves; bibs and aprons; curtains; disposable clothing such as swimsuits, baby pants and diaper liners; rainwear and protective clothing, seatcovers and headrest covers; non-woven fabrics; and others.

When filled polybutene-1 compositions, particularly in the form of films or sheets, are stretched under defined conditions according to the method of the present invention, there are provided products having surprisingly different properties from the corresponding unstretched compositions. The filled compositions remarkably become opaque or less transparent, and suitably pigmented or dyed compositions will develop color contrasts in comparison to the unstretched compositions.

The second surprising change is a large alteration in the surface properties of the material, so that in addition to the characteristics of the polymer base, the surface now also exhibits characteristics and physical properties of the filler or fillers. In other words, the sheet now presents a heterogeneous surface. This particular feature of filled, suitably stretched polybutene-1 compositions is not shared by other polymers.

For example, when a sheet of polybutene-1 filled with about 50% of calcium carbonate is suitably stretched according to the method of the present invention, the surface becomes receptive and retentive to conventional printing or writing inks, in contrast to the surface of the unstretched composition, from which the ink is easily rubbed off and is thus not ink-retentive. By contrast, similarly filled polyethylene or polypropylene compositions cannot be stretched so as to yield ink-retentive surfaces.

The butene-1 polymers useful in this invention are produced preferably by the Ziegler-type polymerization of butene-1 alone or with olefinically unsaturated monomers to provide polymers having molecular weights of about 20,000 to 2,000,000. Whereas, it is usually preferred to utilize butene-1 homopolymers in the practice of this invention, butene-1 copolymers and terpolymers containing over 50% butene-1 and other comonomers such as ethylene, propylene, styrene, butadiene, isoprene and $C_5$-$C_{20}$ alpha-olefins are also useful.

The butene-1 polymers useful in this invention can have an isotacticity of at least 25% but preferably greater than 50%. The degree of isotacticity is measured by insolubility in diethyl ether.

The filled polybutene composition should contain 20 to 97% butene-1 polymer, and preferably 25 to 90% butene-1 polymer.

The type and amount of filler can be changed to obtain specific properties in the stretched polybutene material. Thus, a fine particle size of less than about 10 microns, e.g. calcium carbonate 2 microns in average size or less, provides a smooth-textured white opaque material with excellent ink-retentivity useful for a bond paper substitute; a larger particle size calcium carbonate, for example, 7 microns or more in average particle size, provides a rough-textured white opaque material with excellent ink-retentivity. Also, a fibrous filler such as wollastonite provides a rough-textured white opaque material with excellent ink-retentivity, a tissue-like appearance, and paper-like "crackle".

The use of reinforcing fillers such as ultrafine or precipitated silicas, carbon blacks, high-styrene styrene-butadiene copolymers, and the like, give increased stiffness, or "crackle".

The fillers can also be used to change or enchance other properties of the stretched and opacified sheets, such as color, degree of flexibility, gloss, smoothness, strength, tear resistance, flame retardency, barrier properties, and the like, using compounding methods which are known in the art.

The fillers useful in this invention can be either inorganic or organic solids, and can be selected so as to modify the properties and obtain specific surface characteristics of the films or sheets. Inorganic fillers include common natural and synthetic fillers and pigments such as kaolin, bentonite, and other clays; carbonates and silicates of calcium, magnesium and barium; oxides and silicates of aluminum, zinc, titanium, lead and zirconium, hydroxides of magnesium and aluminum; mica, talc, pumice, asbestos, and wollastonite; barium and calcium sulfates; different types of silica such as amorphous, diatomaceous, crystalline, reinforcing, ultrafine and pyrogenic; carbon blacks; hydrated aluminum silicates; sodium aluminum fluoride; powdered, microspheroidal and fibrous glass; graphite; iron oxide; lithopone; and pyrophyllite. For special purposes powdered or metal flakes such as aluminum, iron, or zinc may also be used.

The organic fillers useful in this invention include solid polymers such as polystyrene or styrene copolymers; vinyl chloride homopolymers and copolymers; polyethylene, including ultra-high molecular weight polyethylenes; polypropylene; polymethyl-1-pentene; ethylene copolymers and terpolymers; polyacrylic and polymethacrylic acid and esters including copolymers; cellulose esters, microcrystalline cellulose and colloidal cellulose; synthetic rubbers based on butadiene and styrene and based on ethylene and propylene; nitrile polymers and terpolymers such as acrylonitrile-butadiene-styrene; wood flour; cotton linters; polyamides, polyethers and polyurethanes.

In addition to the butane-1 polymer and the inorganic and organic fillers, there may be added to the composition one or more of conventional plastic and rubber compounding additives in the proportions conventionally used for the purpose of improving a particular property. These additives include anti-oxidants or pro-oxidants, thermal stabilizers, ultraviolet stabilizers, optical brighteners or depressants, waxes, hydrocarbon resins, metal stearates, tackifiers and lubricants. Further, pigments and dyes can be incorporated according to the usual practices and foaming agents can also be employed for specific effects.

When polymeric organic fillers are used, the polymeric organic filler portion of the composition should not exceed 150 parts per hundred parts of butene-1 polymer, and it is preferred that the polymer filler portion be less than 110 parts per hundred parts of butene-1 polymer. When used, the level of polymeric filler is preferably at least about 5 parts, more preferably, at least about 10 parts per 100 parts of butene-1 polymer by weight.

The inorganic filler portion of the composition should not exceed 80 weight percent of the total filled polybutene composition and it is preferred that the total composition contain no more than 70 weight percent of inorganic filler. The minimum level of inorganic filler can be about 3%, and is preferably about 5%, when no other fillers are used.

The compositions of this invention can be prepared by conventional blending techniques using such equipment as two-roll mills, Banbury mixers, twin-screw extruders, or shell blenders. It may be practical to mix and blend the polymeric materials together in a first step when polymeric fillers are employed, and then to incorporate any inorganic materials and the other organic additives into the blended polymeric composition. Alternatively, the entire blending operation can be performed in a single step.

The composition may be formed into a sheet or film by any of the techniques commonly available to the converter, such as flat die extrusion, blown extrusion, or film casting followed, if desired, by calendering. For special applications, sheets may be also fabricated by compression or injection molding.

A crucial feature of the present invention is the necessity for specific conditions of stretching, in order to obtain the desired altered surface and opacity properties. Stretching of plastic films is well known in the art and is commonly conducted for the purpose of obtaining "orientation", i.e. improved physical properties such as increased tensile modulus, reduced elongation, and often increased tensile strength. It is known that in order to orient crystalline polymers such as polyethylene and polypropylene in practice, stretching must be conducted within a fairly well defined range of temperature, commonly designated as the "orientation temperature range". This temperature range is approximately equivalent to temperatures above which the crystallites begin to melt, but below the temperature at which crystallites are no longer discernible.

Although films or sheets of filled butene-1 polymer compositions can be oriented at temperatures from about 90° C. up to close to the crystalline melting point of the polymer, stretching the filled butene-1 polymer compositions of the present invention within the orientation temperature range does not yield the paper-like properties which are characteristic of the present novel articles. The method of the present invention requires that the stretching be conducted at temperatures significantly below the orientation temperature range; preferably below about 60° C. and as low as about −25° C., more preferably between about 10° C. and 40° C., and most preferably between about 20° C. and 35° C.

Stretching is conveniently performed as the last stage in the fabrication process, and, although monoaxial stretching yields useful products, it is preferred to stretch the sheets or films biaxially. For example, extruded film may be cooled on a chill roll and stretched by passing through "stretch" rolls operating at a higher speed than the chill roll. Tentering frames may be used and stretching may also be effected by means of gas pressure, as are well known in the art.

As has been noted, stretching modifies the transparency and surface characteristics of the filled butene-1 polymer compositions. The extent of stretching should be sufficient to cause the desired degree of opacification and modification of surface properties. The compositions should be stretched at least about 5% beyond their yield strains, and preferably more than about 20% beyond their yield strains. It should be recognized that the incorporation of fillers particularly at high loadings such as more than about 50%, results in reducing both the yield strain and the elongation at break; the yield strain refers to that extent of stretching beyond which the sheet will no longer return to its original dimension when released. The greatest alteration of surface properties occurs when the compositions are stretched to an elongation just below their breaking point, e.g. about 75 to 90% of their breaking elongations.

The compositions may be stretched immediately after fabrication into sheets or films, or they may be aged for periods up to one year and more before stretching. The rate of stretching is preferred to be the highest rate which is obtainable and controllable with the available equipment; for example, in practice, films can be stretched at rates up to 5,000% elongation per minute, but rates as low as 10% per minute can also yield useful products.

When stretched monoaxially, the compositions generally exhibit a higher tensile strength in the direction of stretching, i.e. the machine direction, than in the transverse direction. With biaxial stretching, the ratio of tensile strengths can be made to approach the value of unity. For products which are to be used as paper substitutes, it is usually desired that the maximum ratio of tensile strengths measured in mutually perpendicular directions within the plane of stretched sheet or film be less than about 3:1, and for many uses, as close to 1:1 as is practical. However, products of the present invention are useful for many applications when this maximum tensile strength ratio is as high as 10:1.

After stretching, the products of the present invention may be converted into paper-like or substitute textile articles by a variety of methods which are well known in the art. For example, the sheets may be adhesive-bonded, stapled, sewn, or heat-sealed. In the case of heat-sealing, e.g. along an edge of a paper substitute sheet, the sealed region will suffer a loss in paper-like properties, but the major part of the surface of the article, which has not been exposed to the heat-sealing temperature, retains its opacity, printability and other desired properties.

The products of the invention will be further described with reference to the accompanying drawings, wherein.

Figure 3:
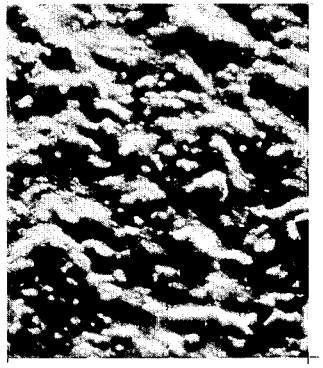
Figure 4:
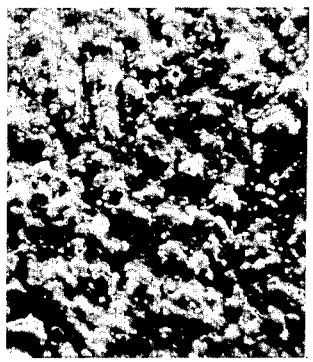
Figure 5:
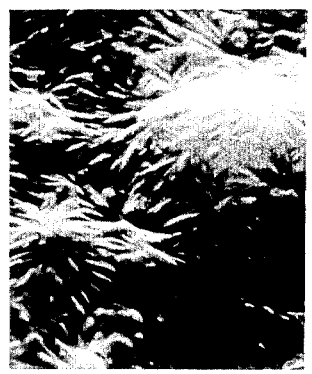
Figure 6:
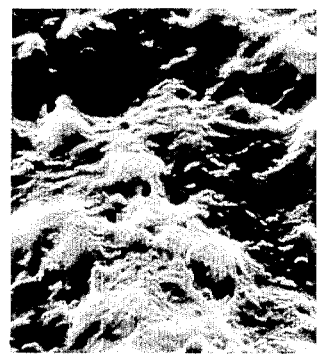

FIGS. 3 and 4 are similar views of another specimen, before and after stretching, at a magnification of only 500X; and FIGS. 5 and 6 are views corresponding, respectively, to FIGS. 3 and 4 but at 10,000X magnification.

Figure 1:
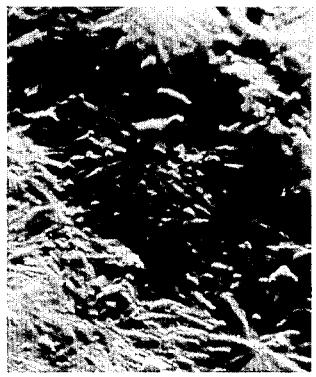
FIG. 1 is a scanning electron micrograph of the surface of a sheet before stretching, the micrograph having been taken at a 45° angle of incidence of the electron beam at 10,000X magnification prior to photographic enlargement.
Figure 2:
FIG. 2 is a similar view of the sheet of FIG. 1 after stretching.

Referring more particularly to the drawings, the sheet of FIGS. 1 and 2 contained 47.4% polybutene-1, 47.4% calcium carbonate, 5% polystyrene, and 0.2% stearic acid. The micrographs were taken at 10,000X magnification before photographic enlargement, using a 45° angle of incidence of the electron beam. Stretching has created micropores in the surface of the sheet, the average diameters of the pores (dark regions on the micrographs) ranging from about 0.5 to 0.01 microns or less. The individual calcium carbonate filler particles are also evident.

Before stretching, (FIG. 1), the filler particles are apparently substantially covered by a membrane consisting of the polybutene-1 resin phase, while after stretching (FIG. 2), the membrane has ruptured around many of the individual particles in the surface, exposing the particles. Thus the unstretched surface is essentially homogeneous, while the stretched surface contains both micropores and exposed filler particles. The combination of micropores and exposed filler particles are believed to account for the excellent ink-receptivity and ink-retentivity of the products of the present invention, and also contribute to the enhanced opacity.

FIG. 3 involves a composition somewhat richer in filler, the view lacking some of the detail of FIG. 1 because of the lower magnification. FIG. 4 shows almost no micropores, they being barely visible because of their small size. When enlarged 20X further to the scale of FIGS. 1 and 2, the micropores are readily visible in FIG. 6 which is the stretched product shown in FIG. 5 before stretching.

As can be seen in these figures, the micropores range in size from about 0.25 to 1.5μ and are spaced from one another, center-to-center, from about 0.04 to 3μ.

The size and spacing ranges may be somewhat broader, however, and still render the product ink-retentive, e.g. the size may range from about 0.01 to 10μ and the spacing from about 0.005 to 20μ.

In the following examples which further illustrate the present invention, all parts are by weight.

EXAMPLE 1

Polybutene-1 (47.4 parts) having a melt index of 0.8 and 93 percent diethyl ether insolubility was mixed with 47.4 parts of calcium carbonate having an average particle diameter of 2 microns and range of 0.3 to 8 microns, 5 parts polystyrene, and 0.2 parts of stearic acid on a two-roll mill at 107° C. The milled sheet was cut into small pieces and fed to a Dreher grinder to obtain pellets. The polybutene pellets were extruded in a one-inch Killion extruder, at an extrusion temperature of about 200° C., through a rod die to obtain rod of about ¼-inch diameter. The rod extrudate was cooled by pulling through a water-filled trough by a chill roll. The rod was cut into 12-inch lengths and was fed again to the Dreher grinder to obtain pellets. The polybutene pellets were extruded in a one-inch Killion extruder, at a temperature of about 210° C., through a 6 inch film die. The film extrudate was dropped onto a water-cooled chill roll to obtain 15 mil film. The grey translucent film was opacified about 30 minutes after extrusion, by holding one end of the film in a vise and pulling the other end by means of calendar rolls at an extension rate of 600% per minute to obtain 4×24-inch lengths of white opaque film. The stretching operation was conducted at room temperature. The laboratory experiment number and the date of the experiment were written on the white opaque and also on unstretched material, using a ball point pen. The ink could not be erased from the stretched white opaque film by rubbing with a finger. The ink was erased readily from unstretched film of the same composition by rubbing over the letters with a finger. The product is shown in FIGS. 1 and 2, before and after stretching, respectively.

EXAMPLE 2

46.9 parts of polybutene-1, having a melt index of 0.8 and 93% ether insolubles, was blended with 46.9 parts of calcium carbonate, 5 parts of polystyrene, 0.2 parts of stearic acid, and 1 part of ultrazin yellow (derived from tetrachloroisoindolinone), using a two-roll mill at 108° C. The milled sheet was cut into small pieces, and fed to a Dreher grinder to obtain pellets. The pellets were rodded as in Example 1, rods ground to pellets, and then extruded through a 6-inch film die to give film 18 mils thick. A piece was cut from the film and compression-molded at 170° C. into a sheet 5 mils thick. The sheet was then cut into strips 1-inch wide.

A strip was then placed in an Instron tensile testing machine with an initial jaw separation of 1 inch. The strip was then stretched at the rate of 20 inches per minute to an elongation of 150%. This corresponds to a stretching rate of 2000% per minute. The elongation at break was about 170%.

Before stretching, the sheet was a glossy, translucent, yellowish-brown color, and was not retentive to ink or pencil. After stretching, the sheet was non-glossy, pale yellow, and opaque, and was receptive and retentive to ink and pencil writing.

A second strip was similarly stretched at a rate of 20% per minute, to an elongation of 125%. After stretching, the sheet was similarly pale yellow and opaque, and was receptive and retentive to ink and pencil writing.

EXAMPLE 3

Example 1 was repeated using calcium carbonate having an average particle size of 7 microns and a particle range of 0.3 to 40 microns. The composition was converted into a rough-textured white opaque film with excellent retentivity to pencil, ink and typewriting.

EXAMPLE 4

Example 1 was repeated using 34.9 parts of polybutene having a melt index of 1.8, 59.9 parts of calcium carbonate having an average particle size of 2 microns, 5 parts of polystyrene and 0.2 parts of stearic acid. The composition was converted into a white opaque film with excellent ink retentivity.

FIGS. 3 and 4 are scanning electron micrographs of the surface of the composition before and after stretching, respectively, taken at 500 X magnification before photographic enlargement, and at 45° incidence for the electron beam. FIGS. 5 and 6 are corresponding electron micrographs of the sheet before and after stretching respectively taken at 10,000X magnification before photographic enlargement. The formation of micropores and the exposure of individual calcium carbonate particles in the stretched composition are clearly evident.

EXAMPLE 5

Example 1 was repeated using 74.8 parts of polybutene-1 having a melt index of 1.8, 20 parts of wollastonite, 5 parts of polystyrene and 0.2 parts of stearic acid. The composition was converted into a rough-textured white opaque film with excellent ink retentivity.

EXAMPLE 6

Example 1 was repeated using 74.8 parts of polybutene-1, 20 parts of ultrafine precipitated silica, 5 parts of polystyrene and 0.2 parts of stearic acid. The composition was converted into a stiff paper-like white opaque film.

EXAMPLE 7

Example 1 was repeated using 59.9 parts polybutene-1, 34.9 parts of calcium carbonate, 5 parts of polystyrene, and 0.2 parts of stearic acid. The filled polybutene composition was converted into a smooth-textured white opaque film having excellent ink retentivity.

This paper substitute is useful as a typewriting and drawing paper.

EXAMPLE 8

Example 1 was repeated using 66.5 parts of polybutene-1, 33.3 parts of calcium carbonate and 0.2 parts of stearic acid. The filled polybutene composition was converted into a white opaque film having excellent ink retentivity and opacity. This product is useful as a book printing paper. The tensile strength of the sheet in the stretched direction was 11,000 psi.

EXAMPLE 10

Example 9 was repeated with 53 parts of butene-1 homopolymer, 23.5 parts of polyvinyl chloride and 23.5 parts of calcium carbonate. With the sides clamped to hold the sheet to constant width, the molded sheet of the composition was stretched manually the same day at room temperature from 4-13/16 inches long and 11.2 mils thick to 5⅞ inches long and 9 mils thick. The laboratory experiment and the date of the experiment were written on the stretched white opaque sheet and on the unstretched translucent sheet. The ink was erased from the unstretched sheet but could not be erased from the stretched white opaque sheet.

EXAMPLE 11, 12, 13, 14, 15 and 16

The compositions given in Table I were blended according to the method given in Example 9, and then molded at 160° C. to give sheets having a thickness of 10 mils. None of these compositions contained inorganic fillers.

Strips of the molded sheets were stretched either manually or by means of an Instron tensile testing machine. Examples 11 and 12 were identical, except that the strips were aged at room temperature for less than 1 day, and for three months, respectively. In all cases the samples were stretched at room temperature beyond their yield points.

As shown in Table I, Examples 11, 12, and 13 were ink-retentive after stretching, while Examples 14, 15 and 16 which contained no organic or inorganic fillers were not ink-retentive.

TABLE I:

| | EXAMPLES 11 to 16 Parts by Weight | | | | | |
|---|---|---|---|---|---|---|
| Example No: | 11 | 12 | 13 | 14 | 15 | 16 |
| Polybutene-1, 2.3 melt index | 69.3 | 69.3 | 65 | 100 | 100 | 100 |
| Polyvinyl chloride | 30.7 | 30.7 | — | — | — | — |
| Polymethacrylonitrile | — | — | 15 | — | — | — |
| Ethylene-propylene copolymer | — | — | 20 | — | — | — |
| Aging period between molding and stretching | less than 1 day | 3 months | less than 1 day | less than 1 day | 6 days | over 1 year |
| Ink-retentivity after stretching | retentive | retentive | retentive | not retentive | not retentive | not retentive |
| Transparency before stretching | transparent | transparent | translucent | translucent | translucent | translucent |
| Transparency after stretching | opaque | opaque | opaque | translucent | opaque | opaque |

EXAMPLE 9

Polybutene (50 parts) having an isotactic content of 93% and a melt index of 2.3 was masticated in a Brabender Plasti-Corder at about 150° C. with 25 parts of calcium carbonate and 25 parts of high density polyethylene. The materials were masticated to obtain a homogeneous product. The masticated blend was molded at 160° C. in a Pasadena press to a translucent white sheet having a thickness of 10 mils. The sheet was stretched manually the same day, beyond its yield point, to a white opaque sheet of 5 mils. The white opaque sheet had excellent ink retentivity. Before stretching, the sheet was not ink retentive. This composition can be used for freezer wrap.

EXAMPLE 17

79.8 parts of polybutene-1 resin with a melt index of 1.8 was blended with 15 parts of pigment-grade talc, 5 parts of polystyrene, and 0.2 parts of stearic acid, on a two-roll mill at 107° C. The composition was extruded into film, as in Example 1, 3 mils thick. The film was stretched at room temperature at an elongation rate of 800% per minute to give an opaque white sheet.

The paper-like sheet is useful as food wrap and shipping wrap.

EXAMPLE 18

50 parts of polybutene-1 having an isotactic content of 93% and a melt index of 2.3 is masticated in a Brabender Plasti-Corder with 25 parts polypropylene of inherent viscosity 1.64 and crystallinity 97%, and 25 parts of calcium carbonate, at about 165° C. to obtain a homogeneous product. The blend is molded at 160° C. to form a white translucent sheet 4 mils thick.

The sheet is stretched to an elongation of 140% in one direction, and then to an elongation of 110% in the perpendicular direction. The resulting paper-like sheet is opaque and ink-retentive and is useful as a food wrap.

EXAMPLE 19

To determine the effect of the temperature of stretching, strips of film of the compositions of Examples 3, 4 and 7 were produced on a 1-inch Killion extruder and were stretched mechanically in an oven at 30° C., 50° C. and 80° C. The conditions of stretching and the characteristics of the stretched films are given in Table I.

TABLE 1
EFFECT OF TEMPERATURE OF STRETCHING ON PROPERTIES OF FILLED POLYBUTENE FILM

| STRETCHING TEMP., °C. | TIME, SEC. | ELONG., % | FILM APPEARANCE | INK RETENTIVITY |
|---|---|---|---|---|
| EXAMPLE 3 COMPOSITION | | | | |
| 30 | 104 | 85 | Excellent | Good |
| 50 | 104 | 109 | Slight wrinkle | Good |
| 80 | 104 | 163 | Non-uniform, slight wrinkle | Poor |
| EXAMPLE 4 COMPOSITION | | | | |
| 30 | 80 | 88 | Excellent | Excellent |
| 50 | 136 | 122 | Slight Wrinkle | Good |
| 80 | Broke Immediately | — | — | — |
| EXAMPLE 7 COMPOSITION | | | | |
| 30 | 95 | 69 | Excellent | Fair |
| 50 | 94 | 91 | Slight Wrinkle | Good |
| 80 | 95 | 188 | Non-uniform | Poor |

EXAMPLE 20

That polypropylene cannot be substituted for polybutene is apparent from the following trials:

Polymer was blended in a Brabender mixer with fillers in various amounts and molded into sheets 25 mils thick. These were cut into strips one-half inch wide and stretched at room temperature, as indicated, on an Instron tester. The specimens were written on with a ball point pen in some instances and the writing thereafter rubbed with a finger to test for smudging.

| (a) Polybutene | 34.9 parts by weight |
|---|---|
| CaCO₃ | 59.9 |
| Polystyrene | 5.0 |
| Stearic acid | 0.2 |

The strips were stretched 200% and 202% and were both ink-receptive and ink-retentive.

(b) Replacing the polybutene in (a) with polypropylene produced strips which broke in trying to stretch them. The elongations at break in different runs were 4, 6, 8 and 13%. The strips were shiny, barely ink-receptive and wholly non-ink-retentive.

(c) The process of (a) was repeated with the following composition:

| Polybutene | 74.9 |
|---|---|
| CaCO₃ | 19.9 |
| Polystyrene | 5.0 |
| Stearic acid | 0.2 |

In two runs strips had elongations at break of 421% and 618% and were matte, ink-receptive and ink-retentive. In other runs the strips were elongated 217 and 404% and also were matte, ink-receptive and ink-retentive.

(d) Replacing the polybutene in (c) with polypropylene resulted in a strip which could be stretched to a break of 55 and 60% in different runs. A third run was conducted to 45% elongation so the strip would not break. The strip was still shiny and barely ink-receptive and -retentive.

It will be appreciated that the instant specification and examples are set forth by way of illustration and not limitation, and that various modifications and changes may be made without departing from the spirit and scope of the present invention.

What is claimed is:

1. The process for making paper-like sheet material which comprises extruding a composition comprising (a) about 20 to 97% by weight of a butene-1 film-forming polymer having a molecular weight in excess of about 20,000, an isotacticity of at least about 25% and a butene-1 content of at least about 50% by weight, and (b) about 3 to 80% by weight of at least one normally solid filler insoluble in said polymer, to form a sheet, and stretching said sheet below about 60° C. at least about 5% beyond its yield strain substantially over its entire surface, whereby the surface of said sheet is rendered discontinuous due to formation of micropores, said sheet is opacified and rendered paper-like.

2. The process according to claim 1, wherein said filler in the resulting sheet has a particle size of less than about 10 microns and is present in about 5 to 80% by weight of the composition.

3. The process according to claim 2, wherein said filler comprises an organic solid.

4. The process according to claim 3, wherein said filler comprises an organic polymer and is present to the extent of at least about 10% by weight of the composition.

5. The process according to claim 2, wherein said filler comprises an inorganic solid.

6. The process according to claim 1, wherein said sheet is stretched in two transverse directions at least about 20% beyond its yield strain.

7. The process according to claim 1, including the further step of applying ink thereto.

* * * * *